US012266031B2

(12) United States Patent
Dazzi et al.

(10) Patent No.: US 12,266,031 B2
(45) Date of Patent: Apr. 1, 2025

(54) MEMORY MAPPING OF ACTIVATIONS FOR CONVOLUTIONAL NEURAL NETWORK EXECUTIONS

(71) Applicant: INTERNATIONAL BUSINESS MACHINES CORPORATION, Armonk, NY (US)

(72) Inventors: Martino Dazzi, Zurich (CH); Pier Andrea Francese, Adliswil (CH); Abu Sebastian, Adliswil (CH); Evangelos Stavros Eleftheriou, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1009 days.

(21) Appl. No.: 17/242,392

(22) Filed: Apr. 28, 2021

(65) Prior Publication Data
US 2022/0350514 A1 Nov. 3, 2022

(51) Int. Cl.
*G06N 3/08* (2023.01)
*G06N 3/063* (2023.01)
*G06T 1/60* (2006.01)

(52) U.S. Cl.
CPC ............... *G06T 1/60* (2013.01); *G06N 3/063* (2013.01); *G06N 3/08* (2013.01)

(58) Field of Classification Search
None
See application file for complete search history.

(56) References Cited

U.S. PATENT DOCUMENTS

| 6,157,751 A | 12/2000 | Olson |
| 9,665,799 B1 | 5/2017 | Munteanu |
| 2017/0103299 A1 | 4/2017 | Aydonat |
| 2018/0189645 A1* | 7/2018 | Chen ............... G06N 3/049 |
| 2019/0102671 A1 | 4/2019 | Cohen |
| 2019/0187963 A1 | 6/2019 | Bokhari |
| 2020/0057919 A1 | 2/2020 | Lovin |
| 2020/0126178 A1 | 4/2020 | Munteanu |
| 2020/0151019 A1* | 5/2020 | Yu .................. G06F 9/5027 |

FOREIGN PATENT DOCUMENTS

CN 111178519 A 5/2020

OTHER PUBLICATIONS

Wei et al ("Memory Access Optimization of a Neural Network Accelerator Based on Memory Controller" Feb. 2021) (Year: 2021).*
International Search Report, International Application No. PCT/IB2022/052592, International Filing Date: Mar. 22, 2022, Mailing Date of Search Report: Jun. 28, 2022, 6 pages.
Stoutchinin, et al., "Optimally Scheduling CNN Convolutions for Efficient Memory Access," arXiv:1902.01492v1 [cs.NE], Feb. 4, 2019, pp. 1-14.

* cited by examiner

*Primary Examiner* — Lut Wong
(74) *Attorney, Agent, or Firm* — Steven M. Bouknight

(57) ABSTRACT

A memory controller circuit for mapping data of a convolutional neural network to a physical memory is disclosed. The memory controller circuit comprises a receiving unit to receive a selection parameter value, and a mapping unit to map pixel values of one layer of the convolutional neural network to memory words of the physical memory according to one of a plurality of mapping schemas, wherein the mapping is dependent on the value of the received selection parameter value.

18 Claims, 8 Drawing Sheets

700

702 receiving unit adapted for receiving a selection parameter value 704 mapping unit adapted for mapping pixel values ...

MEMORY MAPPING OF ACTIVATIONS FOR CONVOLUTIONAL NEURAL NETWORK EXECUTIONS

BACKGROUND

Field of the Invention

The invention relates generally to a memory controller circuit, and more specifically, to a memory controller circuit for mapping data of a convolutional neural network to a physical memory. The invention relates further to a method and a computer program product for mapping data of a convolutional neural network to a physical memory.

Related Art

Artificial intelligence (AI) has escaped the research community long ago and its usage becomes more and more the norm in enterprise computing environments. Nowadays, AI concepts have already been integrated in enterprise applications as well as civil systems (e.g., face recognition). Although there is a large variety of AI algorithms, one of the dominant forms is related to convolutional neural networks (CNN). These are often implemented as deep neural networks with a significant number of hidden layers between an input layer of nodes and an output layer of nodes. In order to control the functioning and/or self-organization of a CNN, a large number of matrix/vector modifications may be required. In particular, when convolutions are performed in a pipeline fashion at each cycle—e.g., by moving a comparably small convolutional kernel matrix over a larger matrix of values—a new row of activations (i.e., output values of activation functions of individual nodes of the CNN) equal to the convolutional kernel size must be read from memory. Hence, from the first to the second cycle, activations must be retrieved and loaded from the respective memory position to a processing unit. The way matrix multiplications are performed may often lead to the following: the component values of a vector—e.g., activation values or activations—are read row-wise and, after the multiplication with respective matrix values, may be stored column-wise in the memory, e.g., as part of the output feature map. Depending on the bit-wise organization of the values in the vectors, certain addressing options may exist and may be used for storing these values in the memory that are not satisfactory for high-performance computing. Hence, the used algorithms may be too slow for using the results of the respective CNN in real-time applications.

There are already some documents addressing memory access optimizations. For example, U.S. Patent Publication No. 2019/0187963 A1 describes a method of configuring the system-on-chip (SoC) to execute the CNN process comprising CNN layers; and the method comprises, for each schedule: determining memory access amount information describing how many memory accesses are required; expressing the memory access amount information as relationships describing reusability of data; combining the relationships with a cost of writing and reading from an external memory, performing memory access information and, determining a memory allocation for on-chip memory of the SoC for the input feature maps and the output feature maps.

Additionally, U.S. Patent Publication No. 2019/0102671 A1 discloses a CNN accelerator including a CNN circuit for performing a multiple-layer CNN computation, wherein the multiple layers are to receive an input feature according to an input feature map and a weight matrix per output feature, wherein outputs of a first layer provides an input for a next layer and, a mapping circuit to access a three-dimensional input matrix stored as a Z-major matrix.

However, state-of the art publications fail to describe an optimized way for accessing and storing vector element values in a way for high-speed read and write processes without the need of masking or de-masking specific bit areas in consecutive memory words.

Hence, there may be a need to provide a flexible usage of memory resources for the use of CNN operations, and in particular, for the way output values of activation functions may be accessed and written back to the memory in order to support high-speed matrix/vector operations.

SUMMARY OF THE INVENTION

According to one aspect of the present invention, a memory controller circuit for mapping data of a convolutional neural network to a physical memory may be provided. The memory controller circuit may comprise a receiving unit to receive a selection parameter value, and a mapping unit to map pixel values of one layer of the convolutional neural network to memory words of the physical memory according to one of a plurality of mapping schemas, wherein the mapping is performed dependent on the value of the received selection parameter value.

According to another aspect of the present invention, a method for mapping data of a convolutional neural network to a physical memory may be provided. The method may comprise receiving a selection parameter value, and mapping pixel values of one layer of the convolutional neural network to memory words of the physical memory according to one of a plurality of mapping schemas, wherein the mapping performed is dependent on the value of the received selection parameter value.

The proposed memory controller circuit for mapping data of a convolutional neural network to a physical memory may offer multiple advantages, technical effects, contributions and/or improvements:

In general, it may be controllable how variables are stored in words of a physical memory of a computer system. Such selectable and controllable mapping schemes may vary from application to application. The schemes may differ basically in the way the variables—i.e., bit values—may be stored in the physical memory. A variable may always start at the beginning of a physical memory word or may also span two words, wherein a first portion of the bits of the variable may be stored in a first addressable memory word and a second portion of the bits of the variable may be stored in a second addressable memory word which is adjacent to the first addressable memory word. Furthermore, a physical memory word may contain at most one variable, or contain multiple variables, wherein all the bits of one variable are stored in one addressable memory word, and all the bits of a second variable are stored adjacent to the bits of the first variable in the same memory word.

In addition, the way the variables are aligned with the word boundaries may also be selected dynamically at any time by a specific parameter that may be set outside of the memory controller circuit and received by the memory controller circuit. On the other side, the selection variable may be a portion of variables, e.g., hyper-parameters, of the convolutional neural network. Hence, the selection variable may be part of the meta-parameters of a layer of the neural network of the complete neural network.

This flexible and adaptive alignment of variables and physical memory words may allow a balance between an optimized usage of available memory or an optimized performance of the CNN, e.g., for high-speed data throughput. Additionally, it should also be mentioned that the concept proposed here is not only useful for CNNs but any other form of computational results in which matrix operations—in particular, matrix vector multiplications—are involved.

Furthermore, the proposed memory controller circuit and the related method may be used with all digital computing environments but may also be used for crossbar arrays of computational memory devices which typically may use phase change memory units (PCM) to store more than one bit per physical storage cell. Moreover, the proposed memory controller circuit may also be directly integrated with digital processing and/or storage devices as well as the cross by arrays of competition or memory devices.

In the following, additional embodiments of the inventive concept—applicable to the memory controller circuit as well as for the related method—will be described.

According to an interesting embodiment of the memory controller circuit, the mapping schema may be an intra-word adjacent mapping schema (IWAP). Thereby, bit values of portions of different pixel values are mapped to one physical memory word in a contiguous manner Hence, the digital representations of the outputs of the activation functions—i.e., the value of the pixel values—are stored in continuous memory words spanning across word boundaries. This may represent the most compact form of storing a resulting feature map of an intermediate result of a convolutional neural network.

According to another permissive embodiment of the memory controller circuit, the mapping schema may be a kernel word interleaving schema (KLIP). Thereby, only bit values of portions of different pixel values are mapped to the physical memory such that, at most, a number of pixels equal to the size of a kernel of a convolutional neural network operation may be mapped contiguously to adjacent memory words. Hence, some space may be left empty in the memory, in particular, bits relating to an end of the bits required for the size—i.e., the bits required for one dimension (i.e., one row of one column)—of the kernel matrix for the convolutional computation. This version may not be as compact as in the IWAP schema. However, read and write operations may be quicker if compared to the IWAP schema.

According to another useful embodiment of the memory controller circuit, the mapping schema may be an activation word interleaving schema (PLIP). Thereby, bit values of pixel values may be mapped such that a memory word comprises bit values of at most one pixel. The remaining bits of the memory word may be left empty. However, if the length in bits of the pixel value is larger than the word size of the physical memory, more than one word of the physical memory may be used for storing the pixel value. This storage method—or mapping schema—for the pixel values of a CNN may represent the most efficient one in terms of read and write speeds. However, this storage method may also require the largest amount of physical memory words.

According to another embodiment of the memory controller circuit, the selection parameter value may be comprised in a set of parameter values of a layer of the convolutional neural network. Such a set of parameter values may comprise—besides the selection parameter value—any data describing variables of the CNN, e.g., a number of nodes in the specific layer, a layer number, an activation function, weighing values, identifiers of connections to nodes of other layers, and other subsets of the metadata parameter values (or hyper-parameters of the CNN).

According to another embodiment of the memory controller circuit, the selection parameter value may be independent of the parameter values of a layer of the convolutional neural network. Thus, the mapping schema may be selected freely, and the mapping schema used may be changed dynamically after each matrix vector operation. This may allow a high degree of freedom regarding the usability of the proposed concept. Hence, the mapping schema may also be used outside the scope of convolutional neural networks. Thus, the change of the mapping schema of any variable to words of the physical memory may be changed completely independent of an application context and at any time.

According to an additional embodiment of the memory controller circuit, the physical memory may be selected out of the group comprising a static random access memory, a latched based memory, and a dynamic random access memory. These types of word-wise organized and addressable memory units may represent a typical set of storage used in modern computing. However, the concept proposed here may also be applied to other forms of word-wise storage units (e.g., solid state disks).

According to another embodiment of the memory controller circuit, the memory controller circuit may be integrated together with physical memory. Hence, both components may be integrated on-chip and in silicon on one die. This may result in a smaller physical footprint for the related integrated circuits.

According to another embodiment of the memory controller circuit, the physical memory storing input values of a computational memory may be integrated with the computational memory. Typically, computational memory designs comprise input and output latches. For a mapping of pixel values of a CNN, the concept proposed here may also be applied in a completely on-chip integrated form.

According to a further enhanced embodiment of the memory controller circuit, physical memory storing input values of a digital memory—e.g., conventional RAM—may be integrated with a digital processing unit, like, a CPU (central processing unit), a GPU (graphic processing unit) or other dedicated hardware circuits, e.g., AI accelerators.

Furthermore, embodiments may include a related computer program product, accessible from a computer-usable or computer-readable medium providing program code for use by or in connection with a computer or any instruction execution system. For the purpose of this description, a computer-usable or computer-readable medium may be any apparatus that may contain means for storing, communicating, propagating or transporting the program for use by or in connection with the instruction execution system, apparatus, or device.

BRIEF DESCRIPTION OF THE SEVERAL VIEWS OF THE DRAWINGS

It should be noted that embodiments of the invention are described with reference to different embodiments. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of embodiment, and any combination between features relating to different embodiments, in particular, between features of the method type claims and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
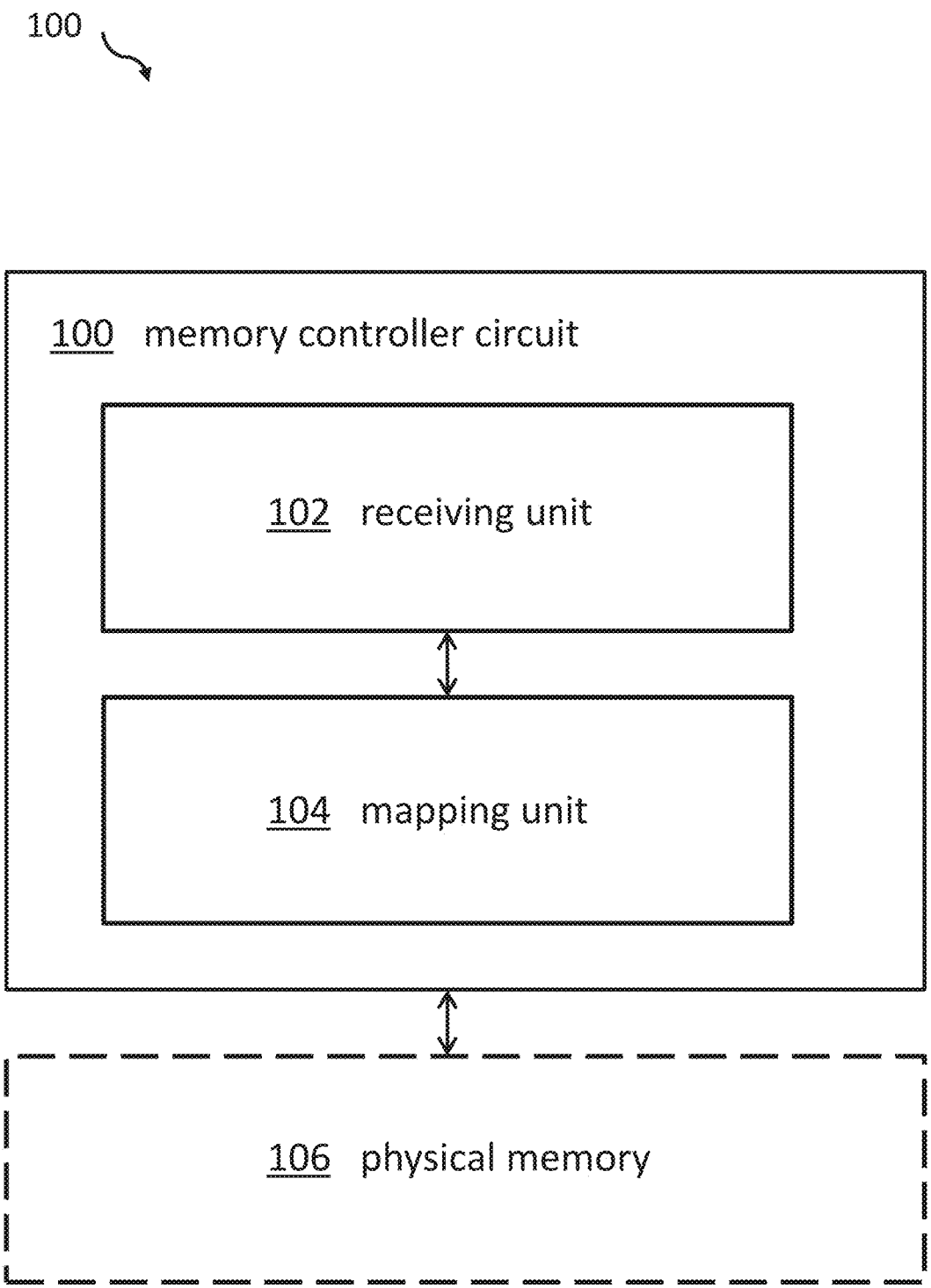

Preferred embodiments of the invention will be described, by way of example only, and with reference to the following drawings:

FIG. 1 shows a block diagram of an embodiment of the inventive memory controller circuit for mapping data of a convolutional neural network to a physical memory.

Figure 2:
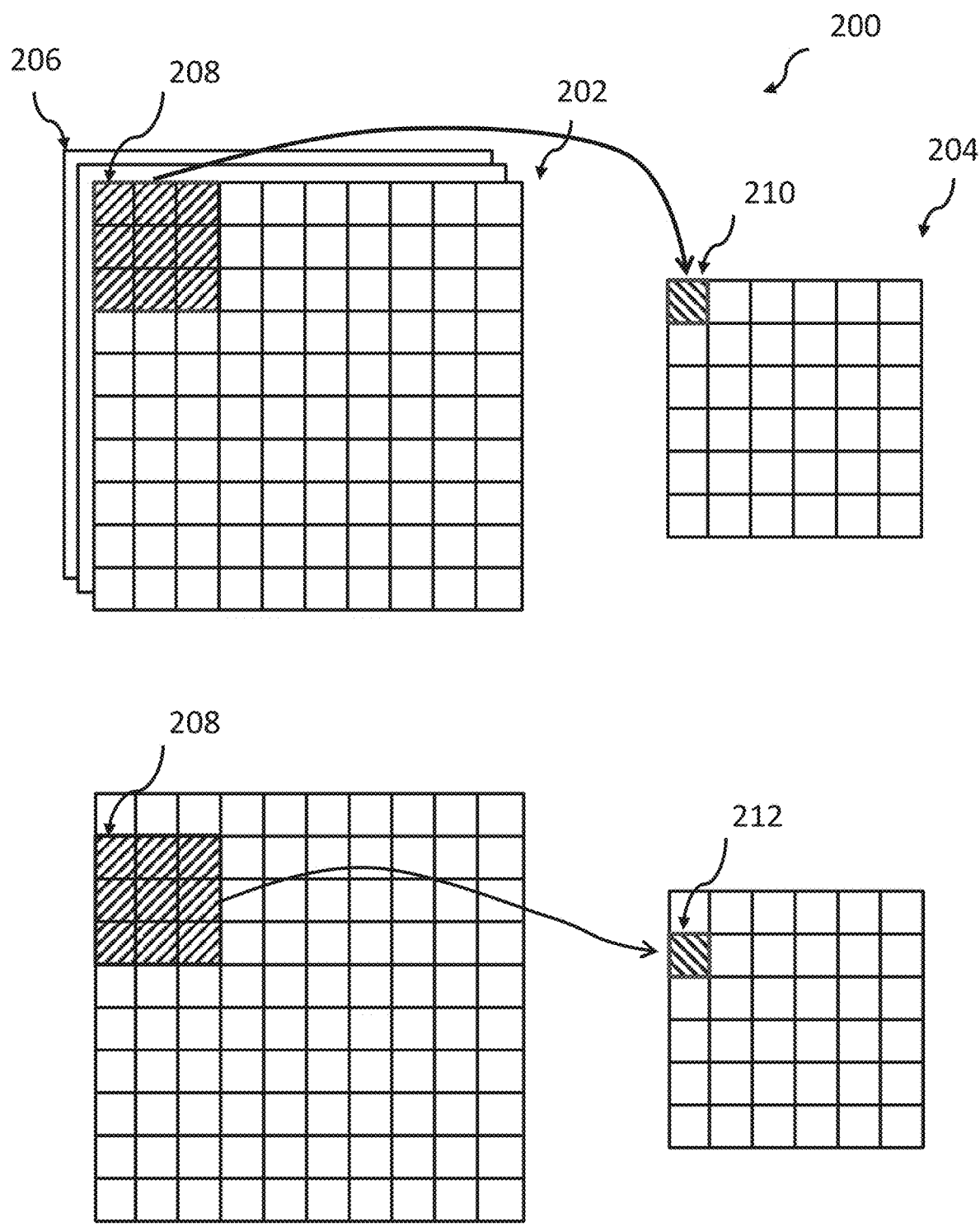

FIG. 2 shows a block diagram of an embodiment of an operation in a CNN involving a feature map, a kernel matrix, and a related output.

Figure 3:
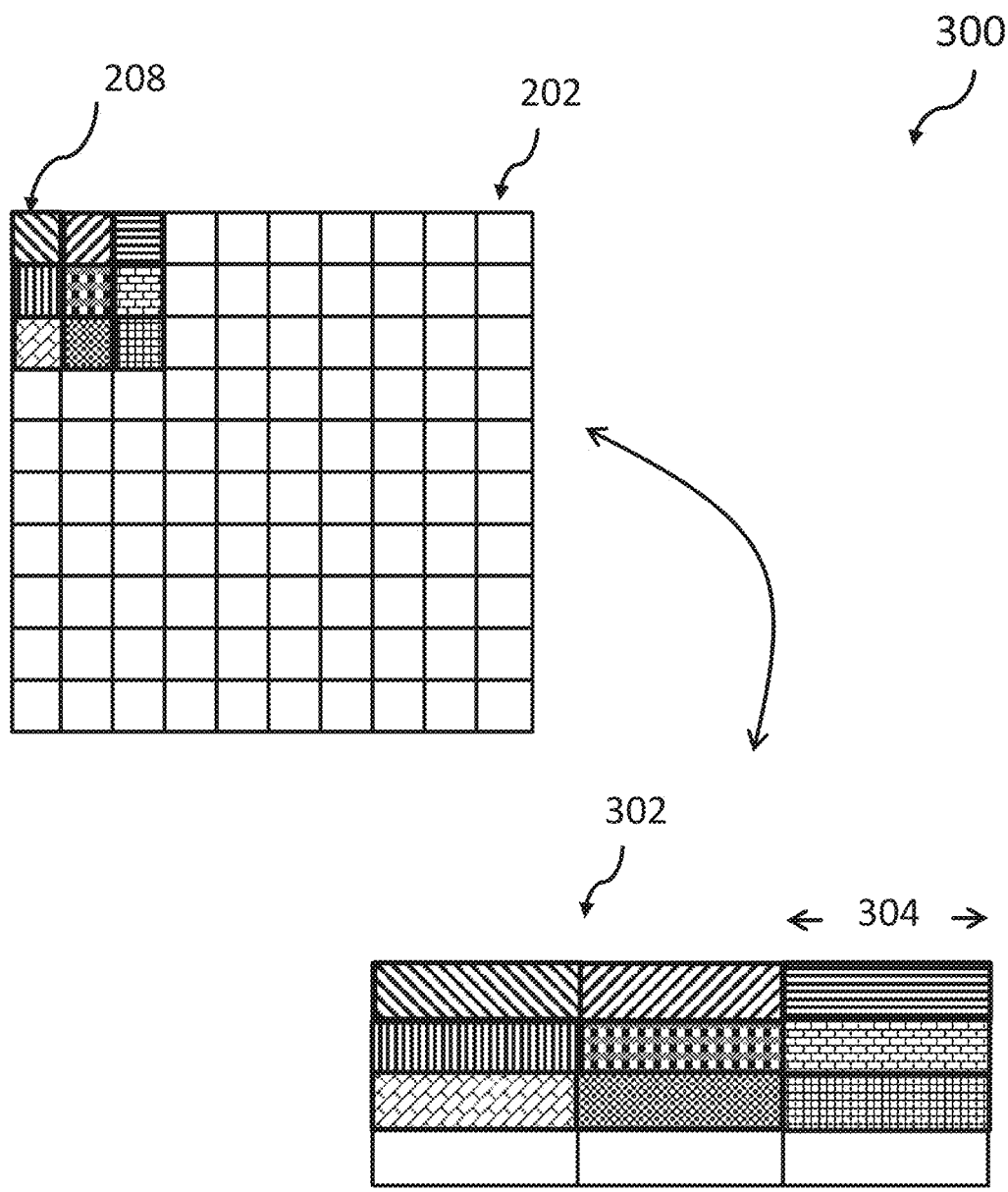

FIG. 3 shows a block diagram of an idealized embodiment of the here proposed concept.

Figure 4:
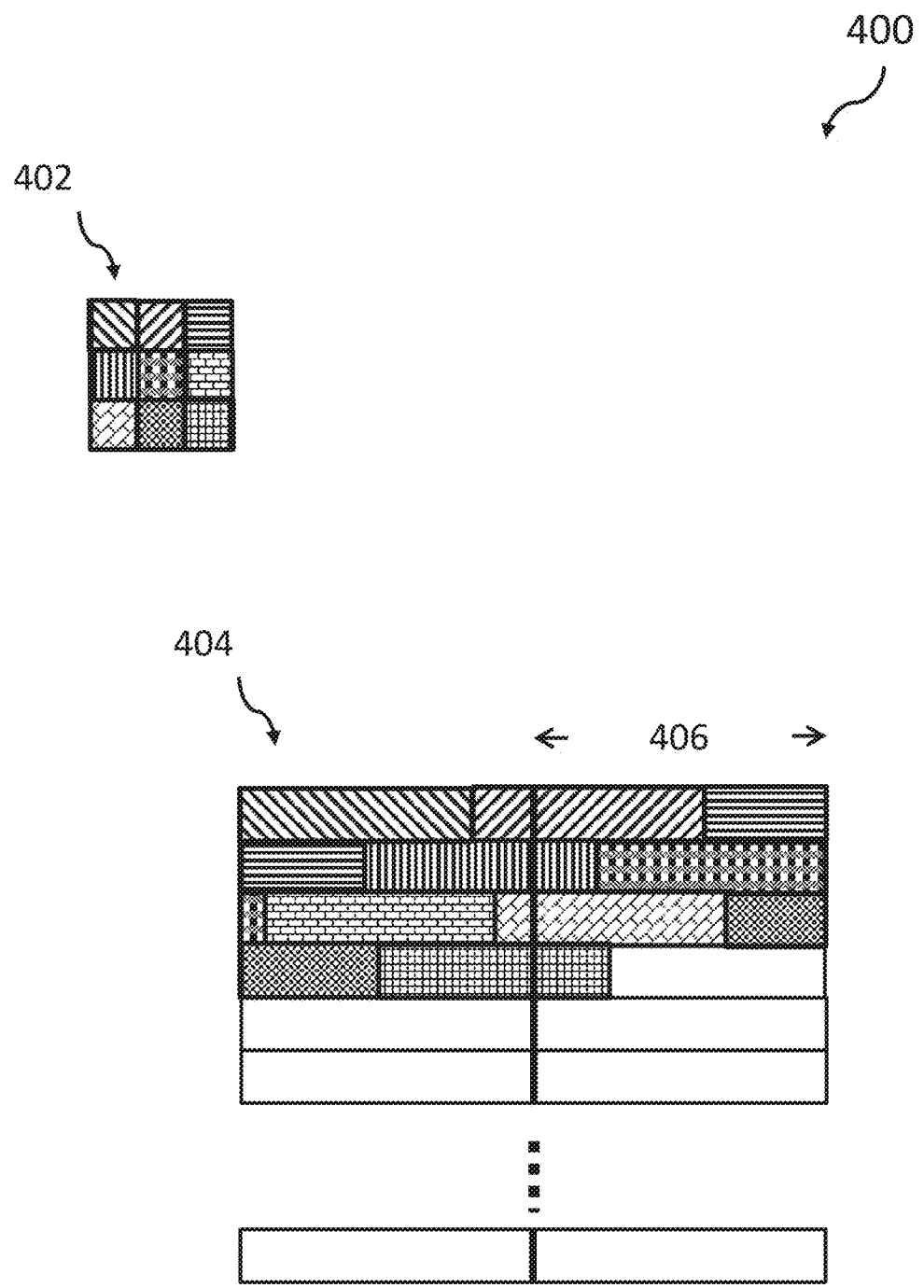

FIG. 4 shows a block diagram of an embodiment of the IWAP schema for mapping of pixel values to the physical memory.

Figure 5:
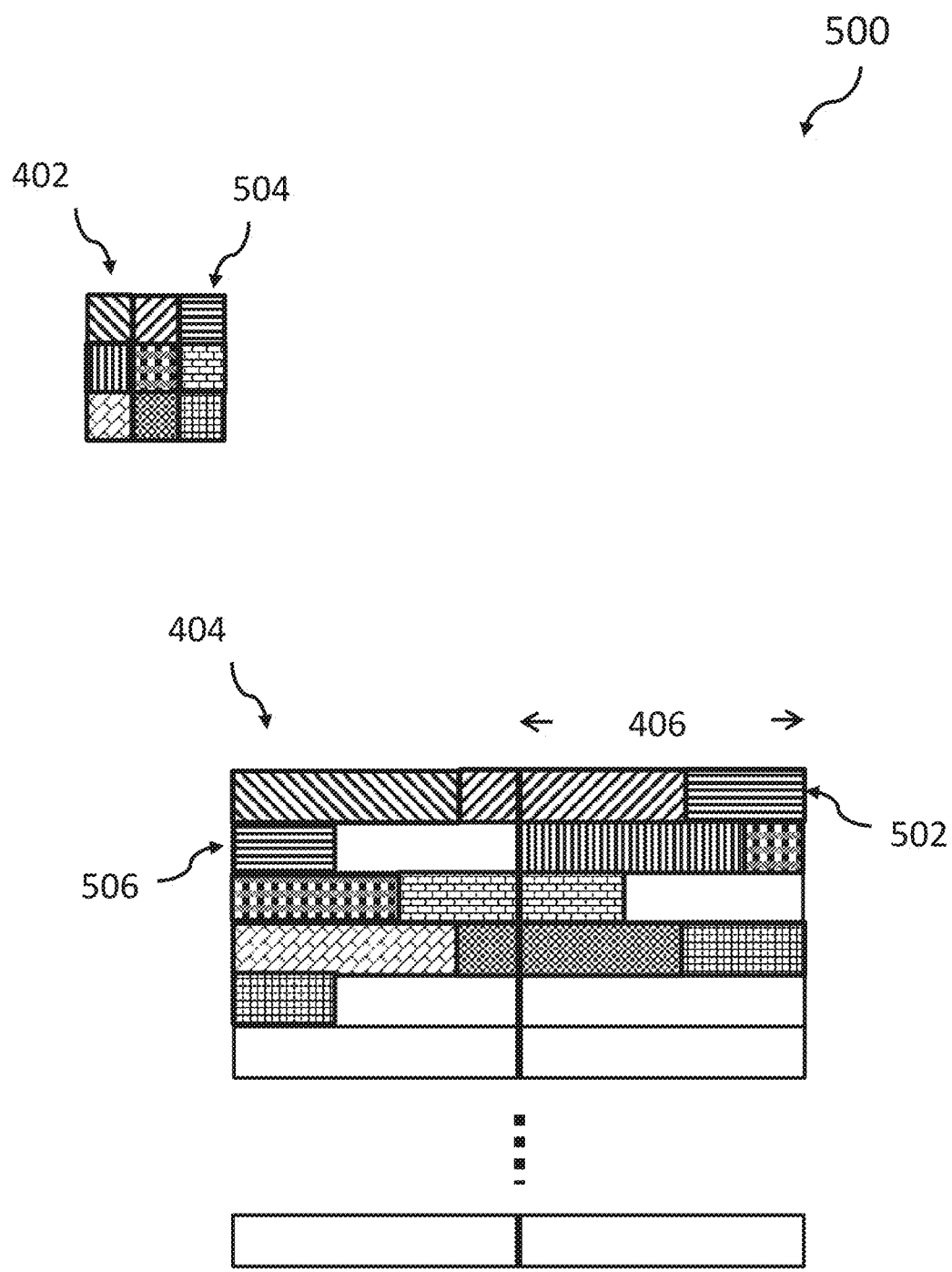

FIG. 5 shows a block diagram of an embodiment of the KLIP schema for mapping of pixel values to the physical memory.

Figure 6:
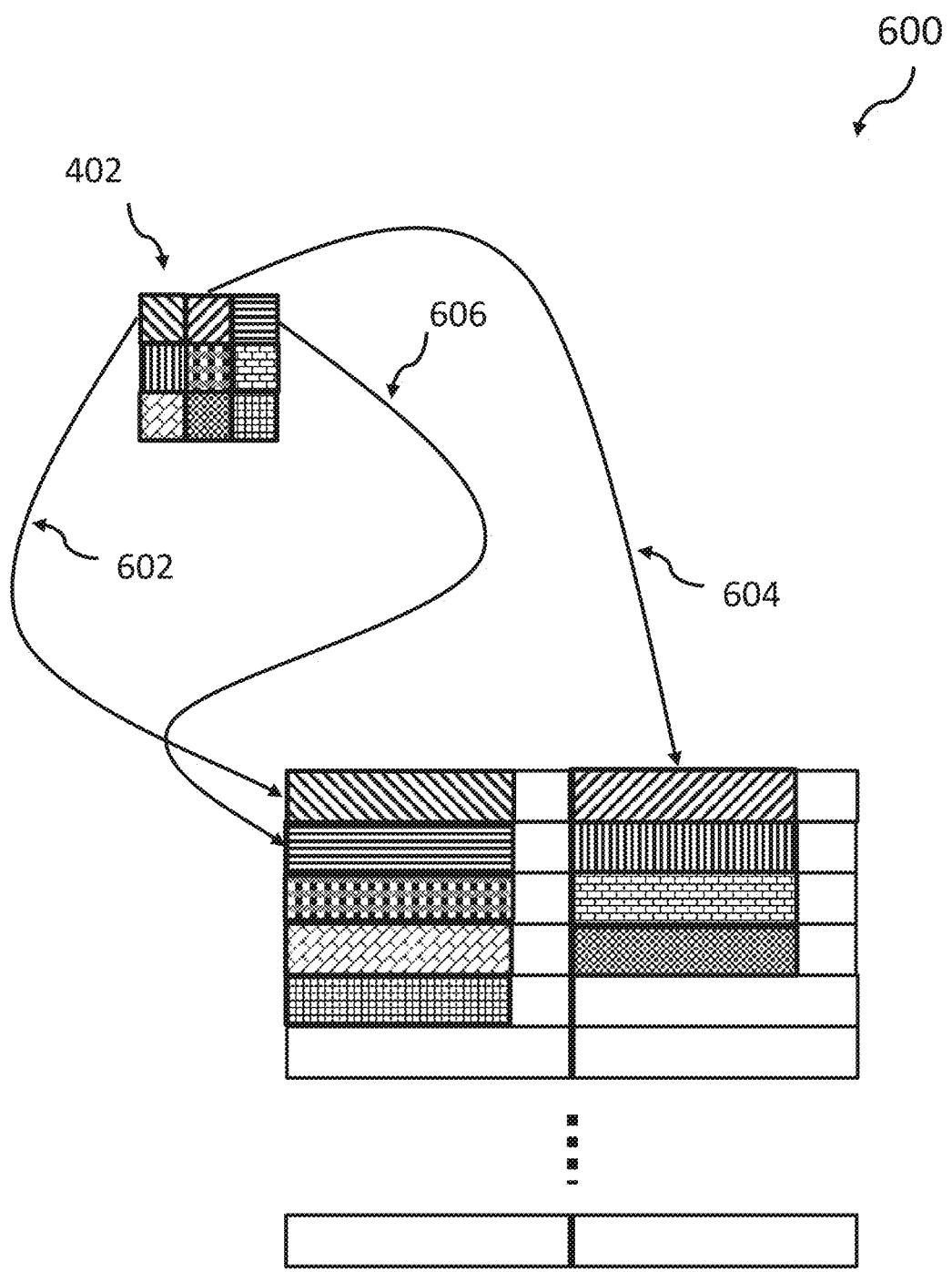

FIG. 6 shows a block diagram of an embodiment of the PLIP schema for mapping of pixel values to the physical memory.

Figure 7:
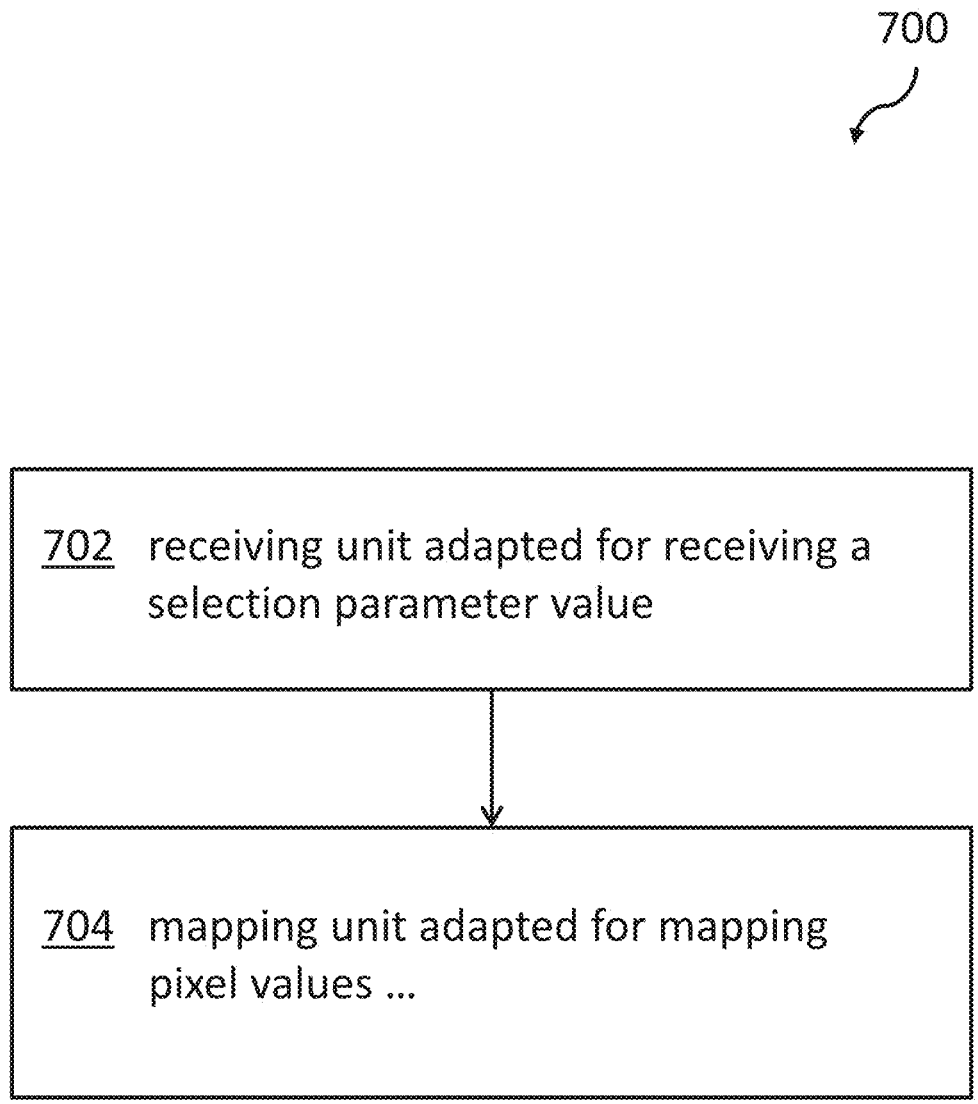

FIG. 7 shows a block diagram of an embodiment of the inventive method for mapping data of a convolutional neural network to a physical memory.

Figure 8:
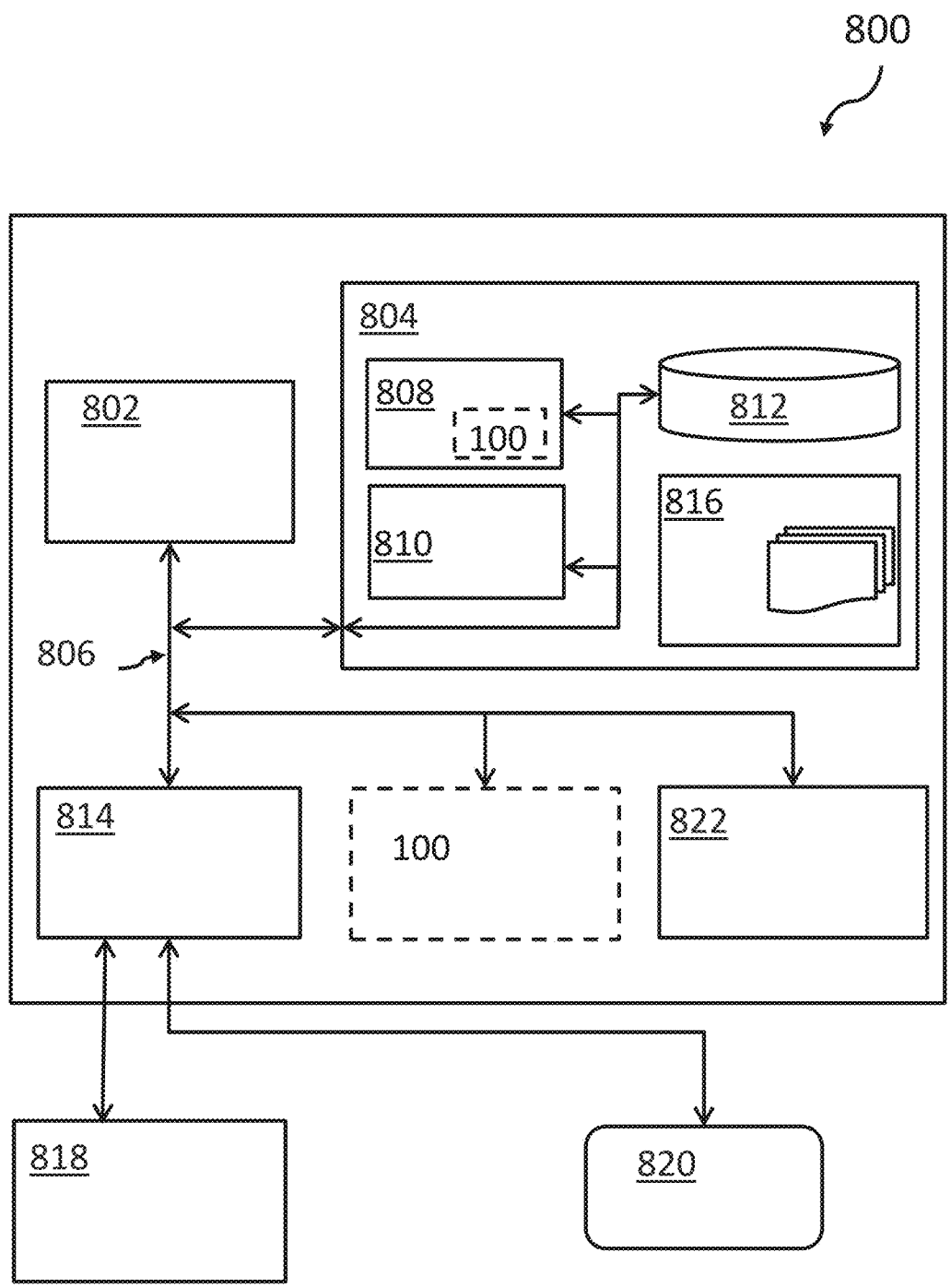

FIG. 8 shows an embodiment of a computing system comprising the inventive memory controller.

DETAILED DESCRIPTION

In the context of this description, the following conventions, terms, and/or expressions may be used:

The term 'memory controller circuit' may denote an integrated electronic circuit typically controlling the functioning of the physical memory and controlling the flow of data between the physical memory—typically in form of semiconductor devices—and a CPU. Memory controllers may also be used to control refresh cycles of dynamic RAM devices. However, the focus in the context of this document is on how variables are stored and retrieved to and from the physical memory in relation to the memory word size and memory word organization.

The term 'mapping' may denote here the activity of aligning and storing or retrieving variables whose bit-wise length differs from the word size of the physical memory to words of the physical memory.

The term 'convolutional neural network' (CNN) may denote an artificial neural network comprising an input layer of nodes and output layer of nodes and a plurality of hidden layers of nodes. The specific of a CNN is that mathematical convolutional operations are performed in order to determine the variables of one feature map to a next feature map within the network of nodes.

The term 'physical memory' may denote conventional semiconductor storage devices being organized in single addressable memory words comprising a predefined and fixed number of bits per address, e.g., semiconductor memory chips, like DRAM or SRAM.

The term 'selection parameter value' may here denote a value of selection variable with a small number of bits—e.g., two bits—in order to select the mapping scheme between an output variable of an activation function of one of the nodes of the different layers of the neural network and the way in which this variable is stored in physical memory in terms of an alignment with word boundaries of the physical memory.

The term 'pixel value'—or, in short, pixel—may denote an output variable of one of the nodes of the neural network. Typically, the term pixel value may here be used as output variable of an activation function of a node. Hence, the combined output of a layer within the neural network may be described as many pixels as nodes are available in the related layer of the neural network.

The term 'memory word' or 'physical memory word' may denote the smallest directly addressable unit in a physical memory, i.e., a related semiconductor memory device.

The term 'different pixel values' may denote different variables of output values of different activation functions of different nodes of the CNN.

The term 'intra-word adjacent mapping schema'—or 'intra-word adjacent placing' (IWAP)—may denote a first mapping schema or mapping method of variables in a relationship to word boundaries of the underlying word organization in the physical memory. If the variables require less bits or more bits than the word length and the physical memory, a first portion of the bits required for a the variable are stored in one memory word and the remaining portion of the bits is stored in a next word memory. Bits of a next variable are stored directly after the end of the bits of the first variable, continuing the bit sequence of the first variable (i.e., the bits of the two variables are stored directly adjacent to each other, e.g., staring and ending in a middle of a memory word).

The term 'kernel word interleaving schema'—or 'kernel word interleaving placing' (KLIP)—may denote a second mapping schema or mapping methods of variables. Basically, variables (i.e., pixels) resulting from an operation of the convolutional kernel being moved over a feature map, may be stored as values of a next feature map in the most compact form (i.e., directly adjacent to each other). Hence, each new vector may start with a new word of the physical memory.

The term 'activation word interleaving schema'—or 'pixel-level interleaved mapping' or 'pixel-level interleaved placing' (PLIP)—may denote a third mapping schema or mapping method of variables. Here, each variable is typically stored in one physical memory word because the number of bits required is typically smaller than the number of available bits in a physical memory word. However, it may also be possible that the number of required bits for a variable value may be larger than the available bits and a physical memory word. In this case, the variable may require two or three or more adjacent words. However, in any case, each variable starts with a new word in the physical memory. Details of these three different storage and/or alignment forms are given in the context of the figures described below.

The term 'feature map' may denote one layer of a three-dimensional matrix as presented in the upper left part of FIG. 2. Accordingly, one position in such plane across the entire depth of planes would represent one pixel.

In the following, a detailed description of the figures will be given. All instructions in the figures are schematic. Firstly, a block diagram of an embodiment of the inventive memory controller circuit for mapping data of a convolutional neural network to a physical memory is given. Afterwards, further embodiments, as well as an embodiment of the method for mapping data of a convolutional neural network to a physical memory will be described.

FIG. 1 shows a block diagram of a preferred embodiment of the memory controller circuit 100 for mapping data of a convolutional neural network to a physical memory 106. The memory controller circuit 100 comprises a receiving unit 102 to receive a selection parameter value, and a mapping unit 104 to map pixel values—i.e., output values of activation functions of one layer of the CNN—of one layer of the convolutional neural network to memory words of the physical memory 106 according to one of a plurality of mapping schemas, wherein the mapping is performed dependent on the value of the received selection parameter value. As mentioned above, the transitions or switching from one mapping scheme to another may be bound to a specific application set-up but may also be performed dynamically independent of a specific application set-up. This makes the proposed concept pretty flexible for all kinds of application areas.

It may also be noted that the physical memory 106 is shown with dashed lines because the proposed concept of the memory controller circuit is functionable without the physical memory.

FIG. 2 shows a block diagram of an embodiment 200 of an operation in a CNN involving a feature map 202, a (convolutional) kernel matrix 208 and a related output 204, e.g., also in form of a matrix 204, e.g., feature map. Typically, in convolutional operations, a kernel or kernel matrix 208 is moved—cycle by cycle—over the larger feature map matrix 202 to produce one output value 210 of the result matrix 204. Because of the large number of matrix/vector operations/multiplications and respective read and write operations from a word-oriented physical memory the form of the mapping of the individual values of the matrix elements may have a significant impact on the overall performance of the related computation.

The lower part of FIG. 2 shows that the kernel matrix 208 has been moved downwards by one element for a next cycle to produce a second result value 212 in the related output matrix 204. Additionally, it may be mentioned that in the upper portion of FIG. 2 the feature map 202 is shown as one of a set of feature maps 206. This typically also applies to the lower part of FIG. 2. However, here, it is not shown explicitly.

FIG. 3 shows a block diagram of an idealized embodiment 300 of the concept proposed here. Here, each element of the kernel matrix 208 is shown as a different pattern. However, the squares with the different elements may also relate to the exemplary nine elements of the feature map 202. Each of the patterns may relate to "a pixel" or "a pixel value" (in this description, both terms are used rather as equivalents—those skilled in the art would know how to distinguish them). It becomes apparent that a large number of read and write operations to the physical memory may be required, in particular, when the size (i.e., one dimension of the matrix 202)—and respectively the set 206—comprises several hundred or even several thousand elements.

In an ideal case, the values of the matrix elements 202—shown for the matrix 208—may be mapped to the physical memory 302 which is shown with word boundaries. Each rectangle with a different pattern represents one word with an identical word size 304 measured in bits. However, it is not a typical set-up that the pixel values (i.e., the storage representations of the matrix elements) require exactly the same amounts of bits as available in a word of the physical memory. A word of the physical memory may comprise 64 bits, wherein—for computational efficiency—the matrix elements of the feature map 206 may be 8 bits, 16 bits or 24 bits or even more. Hence, the storage requirements for the pixel values and the word size are typically not completely aligned.

FIG. 4 shows a block diagram of an embodiment 400 of the IWAP schema for mapping of pixel values (or matrix elements) of an exemplary matrix 402 to the physical memory 404. Here, two memory words—each one with a words size 406—are shown side-by-side as an array expanding vertically. In the intra-word adjacent placing mapping scheme, pixel values are stored adjacent to each other in the memory so that different pixel values (or parts thereof) can be stored in the same physical memory word. The placement or mapping mimics the logical organization of the data so that adjacent pixel values of the same row are stored adjacent to each other. Thereby, each pixel value is mapped so that different channels can be stored one after the other and according to the logical size in the future map matrix. Thereby it is assumed then that a pixel is a vector of data, thus, one channel is one element of a vector and each element of the vector, i.e. channel, has a value expressed in bits.

Now, if space is available within one word, different pixel values can be stored in the same word; this is, for example, the case of pixel (0, 0) and pixel (0, 1) in word 1 (i.e., in the top left corner). For a given number of pixel values to be cached, this method or schema requires the minimum possible amount of memory. However, it may require bit-indexes for both storing and fetching the pixel values and can require a different number of cycles for writing and reading the pixel values depending on the timestep (cycle).

FIG. 5 shows a block diagram of an embodiment 500 of the KLIP schema for mapping of pixels—or better pixel values—to the physical memory 404. Using this method, one stores different pixel values within the same word, only if they belong to a single row of an input patch for which vector/matrix multiplications must be computed. Also here (same as in the example before) the feature map volume/matrices is to be convoluted with a 3×3 kernel. Among those highlighted in the figure, the rows of pixel values belonging to input patches for the convolutions are ((0,0), (0,1), (0,2)); ((1,0), (1,1), (1,2)); ((2,0), (2,1), (2,2)). The pixel values of each row are stored continuously to each other in the physical memory words. However, the remaining bit lines within the word comprising the last pixel of the feature map value are left empty. This practice of leaving a part of the memory empty in order to allow the mapping of data and a way that is closer to its logical positioning is somewhat similar to the concept of memory interleaving, typically employed in memory management for CPUs or other processing units (e.g., GPUs).

This mapping scheme leaves a part of the memory words empty to accommodate the positioning or placing of pixel values in memory, it clearly does not use the minimum amount of memory possible for one volume of pixel values. As with the previous mapping schema (i.e., IWAP), it may require a different number of cycles for writing the pixel values depending on the timestep (i.e., competition cycle). Moreover, given that different pixel values can still be stored within one physical memory word, bit line indexes are required for writing. As described above, at every timestep (i.e., every computational cycle), where computations are executed, a new row of an input patch needs to be loaded into the memory. Since the pixel values are mapped contiguously, the number of read cycles is constant at every timestep, and no bit line index is required for reading one complete row.

One can clearly recognize in FIG. 5 that the memory word with the index (1, 0)—i.e., the right one—comprises or stores the first portion 502 of the pixel value of the third horizontal element 504 of the exemplary matrix 402. The second portion 506 of the pixel value of the exemplary horizontal element 504 of the exemplary matrix 402 is stored in the memory word with the index (0, 1)—i.e., the left memory word in the second row. The remaining portion of the memory word with the index (0, 1) 506 is left empty.

This way, each new row of the matrix 402 starts at the beginning of the next available word start of the physical memory. As a result, typically, the last word relating to a horizontal row of the matrix 402 comprises unused bits.

FIG. 6 shows a block diagram of an embodiment 600 of the PLIP schema for mapping of pixel values to the physical memory 404. Using this mapping schema, it is not allowed to store bits of different pixel values within the same word. Each pixel value is stored in a single physical memory word. The unoccupied portion of the word storing each pixel value is left empty. This is somehow similar to the concept of kernel-level interleaving placing or mapping, this time apply to single pixel values across the channel depth. However, if the pixel value measured in bits is larger than one physical memory word, the pixel value crosses the word boundary to the adjacent, next word and leaves the unoccupied portion of second word empty. This schema also works for the case the memory space required for a pixel value is larger than two or three or more physical memory words. Hence, it may be denoted as universal.

This mapping schema has the finest granularity of logical units to be stored and, thus, makes the most efficient use of the local memory. Since every pixel value is individually interleaved, there is no need for a bit line index for the writing of storing words. In contrast to the mapping schemas described above, both, the number of read and write cycles are constant regardless of the pixel values read or stored.

The arrows 602, 604, 606 show, by way of example, some mappings of the first row of the matrix 402 two words of the physical memory 404.

FIG. 7 shows a block diagram of an embodiment of the inventive method 700 for mapping data of a convolutional neural network to a physical memory. The method comprises receiving, 702, a selection parameter value, and mapping, 704, pixel values of one layer of the convolutional neural network to memory words of the physical memory according to one of a plurality of mapping schemas, wherein the mapping is performed dependent on the value of the received selection parameter value.

Additionally, it shall be mentioned explicitly that the concept proposed here can be implemented completely in hardware, completely and software, or a mixture thereof, also including microcode.

Embodiments of the invention may be implemented together with virtually any type of computer, regardless of the platform being suitable for storing and/or executing program code. FIG. 8 shows, as an example, a computing system 800 suitable for executing program code related to the proposed method 700.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the memory mapping circuit 100 for mapping data of a convolutional neural network to the physical memory 808 may be attached to the bus system 806. For this, the memory mapping circuit 100 can also comprise a bus interface circuit.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory(RAM), a read-only memory(ROM), a rigid magnetic disk and an optical disk. Current examples of optical disks include compact disk-read only memory (CD-ROM), compact disk-read/write(CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory(RAM), a read-only memory(ROM), an erasable programmable read-only memory(EPROM or Flash memory), a static random access memory(SRAM), a portable compact disk read-only memory(CD-ROM), a digital versatile disk(DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture(ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network(LAN) or a wide area network(WAN), or the connection may be made to an external computer (for example, through the Internet using an Internet Service Provider). In some embodiments, electronic circuitry including, for example, programmable logic circuitry, field-programmable gate arrays(FPGA), or programmable logic arrays(PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus(systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A memory controller circuit for mapping data of a convolutional neural network to a physical memory, said memory controller circuit comprising:
   a receiving unit to receive a selection parameter value; and
   a mapping unit to map pixel values of one layer of said convolutional neural network to memory words of said physical memory according to one of a plurality of mapping schemas, wherein said mapping is dependent on said value of said received selection parameter value, and wherein the one of the plurality of mapping schemas is an intra-word adjacent mapping schema, and wherein bit values of portions of different pixel values are mapped to one physical memory word in a contiguous manner.

2. The memory controller circuit according to claim 1, wherein the one of the plurality of mapping schemas is a kernel word interleaving schema, wherein bit values of portions of different pixel values are mapped to said physical memory such that at most a number of pixels equal to a size of a kernel of a convolutional neural network operation is mapped contiguously to adjacent memory words.

3. The memory controller circuit according to claim 1, wherein the one of the plurality of mapping schemas is an activation word interleaving schema, wherein bit values of pixel values are mapped such that a memory word comprises the bit values of at most one pixel.

4. The memory controller circuit according to claim 1, wherein said selection parameter value is comprised in a set of parameter values of a layer of said convolutional neural network.

5. The memory controller circuit according to claim 1, wherein said selection parameter value is independent of said parameter values of a layer of said convolutional neural network.

6. The memory controller circuit according to claim 1, wherein said physical memory is selected out of a group comprising a static random access memory, a latched based memory, and a dynamic random access memory.

7. The memory controller circuit according to claim 1, wherein said memory controller circuit is integrated together with physical memory.

8. The memory controller circuit according to claim 1, wherein said physical memory stores input values of a computational memory and is integrated with said computational memory.

9. The memory controller circuit according to claim 1, wherein physical memory stores input values of a digital memory and is integrated with a digital processing unit.

10. A method for mapping data of a convolutional neural network to a physical memory, said method comprising:
    receiving a selection parameter value; and
    mapping pixel values of one layer of said convolutional neural network to memory words of said physical memory according to one of a plurality of mapping schemas, wherein said mapping is dependent on said value of said received selection parameter value, and wherein the one of the plurality of mapping schemas is an intra-word adjacent mapping schema, and wherein bit values of portions of different pixel values are mapped to one physical memory word in a contiguous manner.

11. The method according to claim 10, wherein the one of the plurality of mapping schemas is a kernel word interleaving schema, wherein bit values of portions of different pixel values are mapped to said physical memory such that at most a number of pixels equal to a size of a kernel of a convolutional neural network operation is mapped contiguously to adjacent memory words.

12. The method according to claim 10, wherein the one of the plurality of mapping schemas is an activation word interleaving schema, wherein bit values of pixel values are mapped such that a memory word comprises the bit values of at most one pixel.

13. The method according to claim 10, wherein said selection parameter value is comprised in a set of parameter values of a layer of said convolutional neural network.

14. The method according to claim 10, wherein said selection parameter value is independent of said parameter values of a layer of said convolutional neural network.

15. The method according to claim 10, wherein said physical memory is selected out of a group comprising a static random access memory, a latched based memory, and a dynamic random access memory.

16. The method according to claim 10, wherein said memory controller circuit is integrated together with physical memory.

17. The method according to claim 10, wherein said physical memory stores input values of a computational memory and is integrated with said computational memory or with a digital processing unit.

18. A computer program product for mapping data of a convolutional neural network to a physical memory, said computer program product comprising a computer readable storage medium having program instructions embodied therewith, said program instructions being executable by one or more computing systems or controllers to cause said one or more computing systems to:
  receive a selection parameter value; and
  map pixel values of one layer of said convolutional neural network to memory words of said physical memory according to one of a plurality of mapping schemas, wherein said mapping is dependent on said value of said received selection parameter value, and wherein the one of the plurality of mapping schemas is an intra-word adjacent mapping schema, and wherein bit values of portions of different pixel values are mapped to one physical memory word in a contiguous manner.

* * * * *